United States Patent [19]

Ooi

[11] Patent Number: 5,375,238
[45] Date of Patent: Dec. 20, 1994

[54] NESTING MANAGEMENT MECHANISM FOR USE IN LOOP CONTROL SYSTEM

[75] Inventor: Yasushi Ooi, Tokyo, Japan
[73] Assignee: NEC Corporation, Tokyo, Japan
[21] Appl. No.: 796,261
[22] Filed: Nov. 20, 1991

[30] Foreign Application Priority Data

Nov. 20, 1990 [JP] Japan ................... 2-315344

[51] Int. Cl.5 ............ G06F 9/40; G06F 9/30
[52] U.S. Cl. ................. 395/700; 364/DIG. 1; 364/243.1
[58] Field of Search ............. 395/700; 364/243.44, 364/243.1

[56] References Cited

U.S. PATENT DOCUMENTS 4,652,997  3/1987  Kloker ................ 364/200
4,876,642 10/1989  Gibson ................ 364/200

FOREIGN PATENT DOCUMENTS

0221741A2  5/1987  European Pat. Off. .

Primary Examiner—Gareth D. Shaw
Assistant Examiner—A. Katbab
Attorney, Agent, or Firm—Whitham, Curtis, Whitham & McGinn

[57] ABSTRACT

A nesting management mechanism for use in a loop controlling system, comprises a program counter coupled to a program counter bus and incremented each time one instruction is executed, and a loop counter coupled with the program counter bus and set with the number of loops to be executed when a loop execution is executed. The loop counter is decremented each time one loop is completed. A loop start address register is coupled to the program counter bus and set with a loop start address when the loop execution is executed, and a loop end address register is coupled to the program counter bus and set with a loop end address when the loop execution is executed. First, second and third independent hardware stacks of a first-in last-out type are provided for the loop counter, the loop start address register, and the loop end address register, respectively, so as to save respective contents of the loop counter, the loop start address register, and the loop end address register at the time of a loop nesting.

16 Claims, 3 Drawing Sheets

NESTING MANAGEMENT MECHANISM FOR USE IN LOOP CONTROL SYSTEM

BACKGROUND OF THE INVENTION

1. Field of the Invention

The present invention relates to a system for controlling a repeated processing or execution of one or more instructions (called a "loop processing") in a data processing system, and more specifically to a stack management system for a saving and a restoring in the loop processing.

2. Description of Related Art

In the prior art, a loop instruction having no branch overhead is widely used in digital signal processors.

For example, the digital signal processor available under the tradename "320C30" from Texas Instruments has a loop instruction. However, the processor 320C30 does not pay consideration to a nesting. Therefore, if a second loop instruction is executed in the course of execution of a first loop instruction, variable information such as the number of loops, a loop head address, etc. used for control of the first loop is broken.

The digital signal processors available under the tradename "DSP56001" and "DSP96002" from MOTOROLA have a loop instruction having the specification capable of realizing the nesting. When this loop instruction is executed, plural items of information such as the number of loops and the loop head address are set in corresponding registers, respectively, and the contents previously set in the corresponding registers are saved into a separately provided hardware stack.

On the other hand, in the case of describing a two-dimensional data processing by the loop instructions, particularly in the case of accessing a rectangular area processing in an image signal processing, it is preferred to be able to realize the nesting.

Here, one example of the loop processing will be briefly described. When a loop instruction is executed, a loop counter, a loop end address register and a loop start address register are set. Then, a group of instructions included in the loop are sequentially executed. If a value of a program counter reaches an address just before a loop end address, a loop head branch flag is set, so that a next instruction is not executed, and the instruction jumps to the head of the loop. This jump to the head of the loop is executed by transferring a value of the loop start address register to the program counter.

This jump is repeated for the designated number of loops. The value set in the loop counter is decremented by "1" each time the jump occurs. When the value of the loop counter becomes zero, a loop end flag is set, so that the jump no longer occurs, and the operation goes out of the loop.

As mentioned above, the loop counter, the loop end address register and the loop start address register hold a fundamental condition when the loop is executed. If the loop is nested, it is necessary to save and restore the information held in the loop counter, the loop end address register and the loop start address register.

In the conventional digital signal processor, the saving and restoring of the information held in the loop counter, the loop end address register and the loop start address register are realized by transferring information between the loop counter, the loop end address register and the loop start address register and a hardware stack which is provided separately from the loop counter, the loop end address register and the loop start address register and which is provided in common to the loop counter, the loop end address register and the loop start address register and also to other functions.

Namely, when a loop instruction is being executed, if another loop instruction is executed, the contents of the loop counter, the loop end address register and the loop start address register are pushed or transferred to the common hardware stack. When the loop end condition for the second loop is satisfied and the operation goes out of the second loop, the contents of the common hardware stack are popped or restored to the loop counter, the loop end address register and the loop start address register, respectively, so that the first loop is restarted from a point where the nesting occurs.

Ordinarily, it is a general rule in the digital signal processor that a throughput of an instruction execution is one clock.

At a loop starting point, it is possible to control to the effect that the loop instruction itself is executed with a plurality of clocks. Therefore, no problem occurs. On the other hand, when a loop ending condition is satisfied, no loop ending instruction exists. However, the contents of the common hardware stack must be popped into or restored to the loop counter, the loop end address register and the loop start address register, respectively. This processing cannot be executed in only one clock. In other words, during a period of transferring the contents of the common hardware stack into to the loop counter, the loop end address register and the loop start address register, respectively, a plurality of instructions are executed in parallel.

In general, the common hardware stack is used not only for the loop processing but also for the saving and restoring of the status in subroutine callings, interrupt processings and exception processings. However, for a period during which the contents of the common hardware stack are transferred into the loop counter, the loop end address register and the loop start address register, it is not possible to write an instruction (for example, a subroutine call instruction, a return instruction, a loop instruction, etc.) using the common hardware stack. In addition, continuous loop endings are not permitted. In other words, a great restriction concerning the loop ending is encountered in describing or preparing a program.

Furthermore, there is a possibility that the common hardware stack underflows, and an extra hardware logic for controlling this exception processing is also required.

As seen from the above, when the loop instruction is executed, if the status is saved using only one hardware stack, various disadvantages are encountered. Namely, extra timing clocks are required at the time of restoring the status. The programming is subjected to the above mentioned restriction, and an additional control logic for the exception processing is inevitably required.

SUMMARY OF THE INVENTION

Accordingly, it is an object of the present invention to provide a nesting management mechanism which has overcome the above mentioned defect of the conventional one.

Another object of the present invention is to provide a nesting management mechanism, which requires no extra timing clocks at the time of restoring the status, and also needs no additional control logic for the exception processing, and which allows the programming to be subjected to no restriction.

The above and other objects of the present invention are achieved in accordance with the present invention by a nesting management mechanism for use in a loop controlling system, comprising a program counter bus, a program counter coupled to the program counter bus and updated each time one instruction is executed, a loop counter coupled with the program counter bus and set with the number of loops to be executed when a loop execution is executed, the loop counter being updated each time one loop is completed, a loop start address register coupled to the program counter bus and set with a loop start address when the loop execution is executed, and first and second hardware stacks of a first-in last-out type individually provided for the loop counter and the loop start address register, respectively, so as to save respective contents of the loop counter and the loop start address register at the time of a loop nesting.

The above and other objects, features and advantages of the present invention will be apparent from the following description of preferred embodiments of the invention with reference to the accompanying drawings.

DESCRIPTION OF THE PREFERRED EMBODIMENTS

Figure 1:
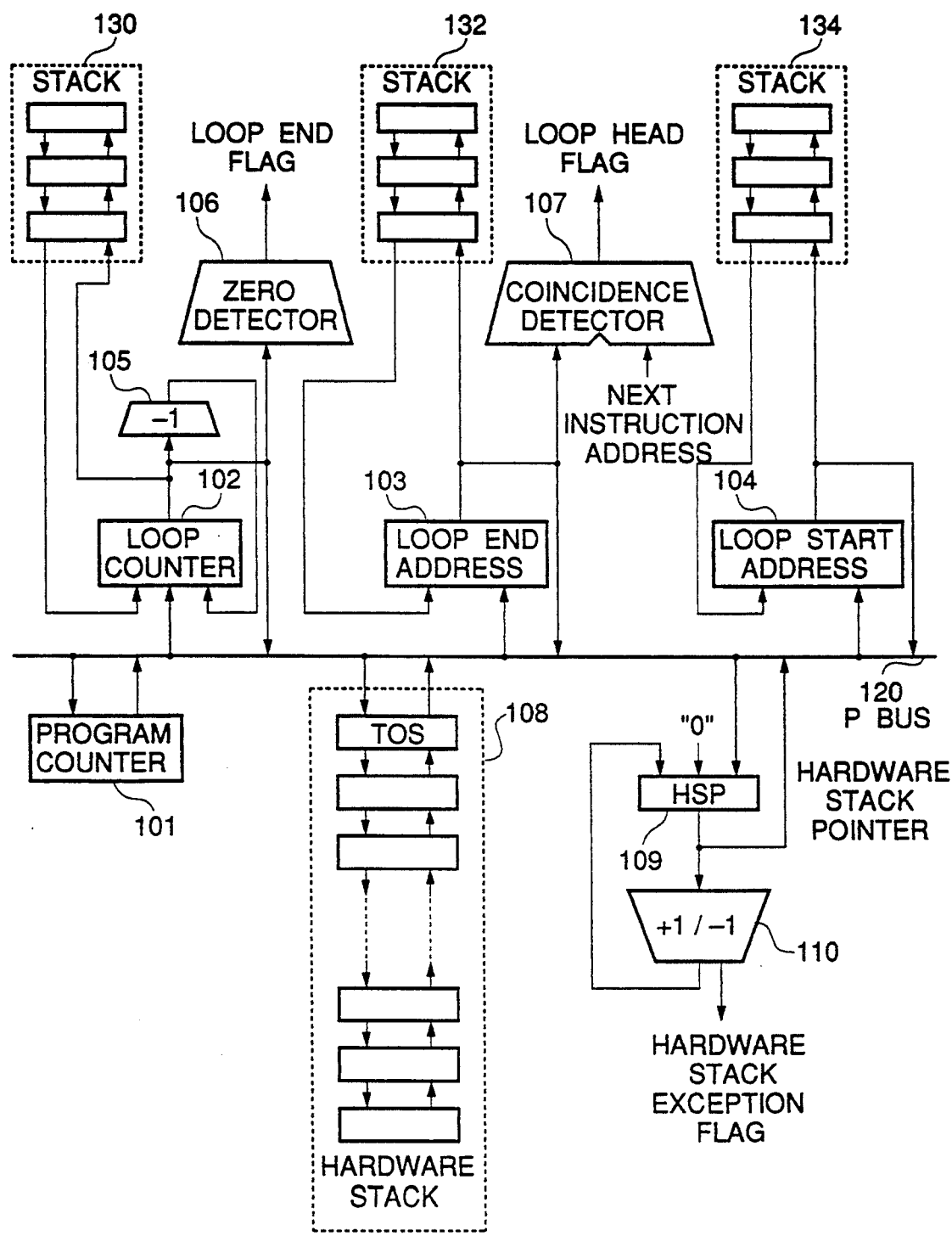
FIG. 1 is a block diagram of a first embodiment of the nesting management mechanism of the loop control system in accordance with the present invention.

Referring to FIG. 1, there is shown a block diagram of a first embodiment of the nesting management mechanism of the loop control system in accordance with the present invention.

As shown in FIG. 1, the first embodiment includes a program counter 101, a loop counter 102, a loop end address register 103, a loop start address register 104, a decrementer 105, a zero detector 106, a coincidence detector 107, a hardware stack 108, a hardware stack pointer 109, and an incrementer/decrementer 110, which are coupled to one another and to a program counter bus 120, as shown. In addition, three hardware stacks 130, 132 and 134 of a first-in last-out type are provided to couple directly with the loop counter 102, the loop end address register 103 and the loop start address register 104, respectively.

Figure 3:
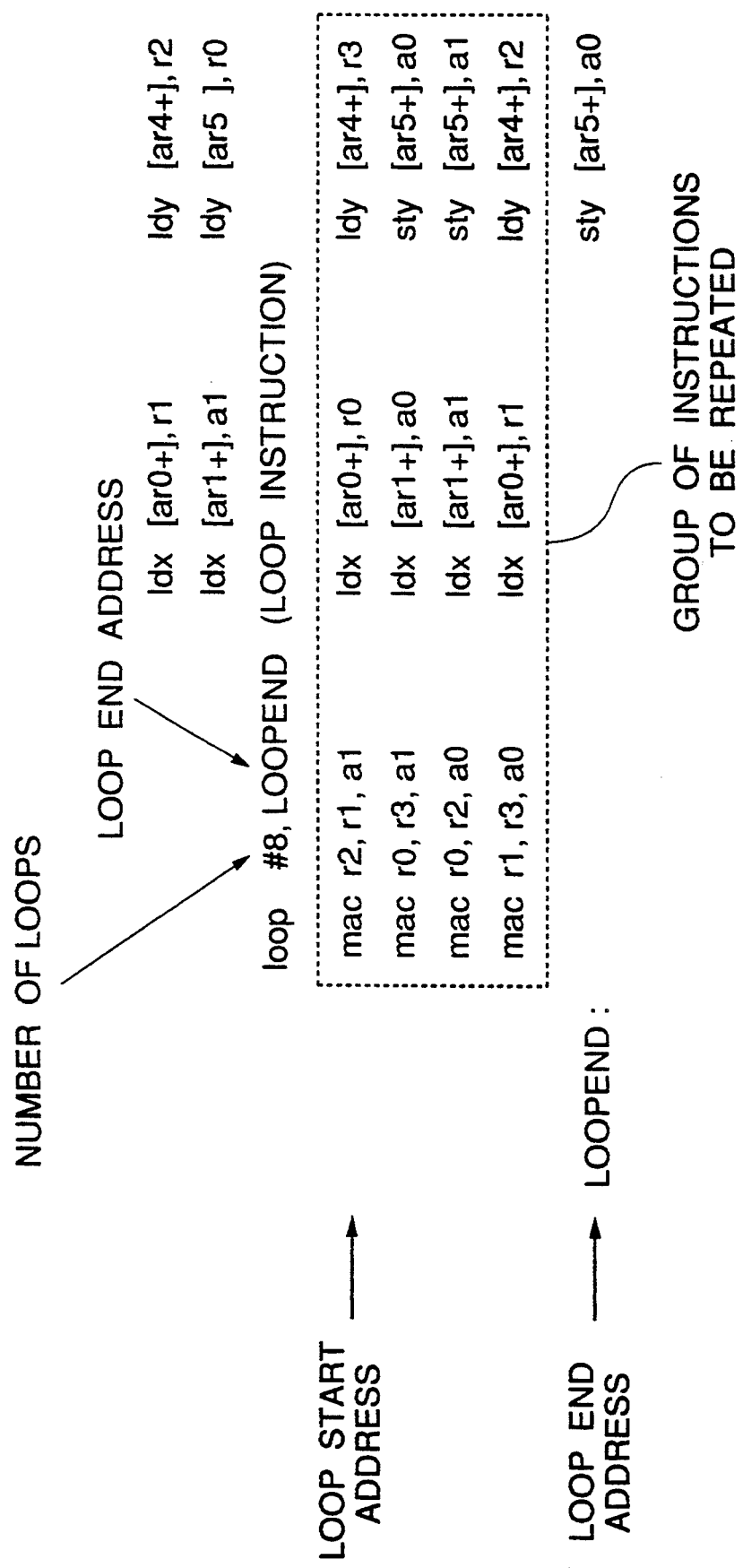
FIG. 3 shows an example of a program using a loop instruction.

Turning to FIG. 3, there is shown an example of a program including a loop instruction. In the loop instruction, the number of loops (namely the number of repetitions) and a loop end address are designated as operands. On the other hand, it is not necessary to definitely describe a loop start address in the instruction, since it is just next to the loop instruction.

Returning to FIG. 1, if a given loop instruction is executed, the loop counter 102, the loop end address register 103 and the loop start address register 104 are set through the program counter bus 120. Then, a group of instructions included in the loop are sequentially executed, while incrementing the program counter 101. The coincidence detector 107 is coupled to receive at its one input the loop end address held in the loop end address register 103 and at its other input an address of an instruction to be executed next. Here, the address of the instruction to be executed next corresponds to the value of the program counter in some case, and another value in another case. If a jump occurs, the address of the instruction to be executed next corresponds to a jump address. Therefore, the other input of the coincidence detector 107 may be given directly from the program counter 101 or from any known means which generates an address for an instruction to be next executed, on the basis of the value of the program counter or another value. If a value of the address of the instruction to be next executed becomes an address just before the loop end address, the coincidence detector 107 generates a loop head branch flag signal, so that a next instruction is not executed and the instruction jumps to the head of the loop. This jump to the head of the loop is executed by transferring a value of the loop start address register 104 to the program counter 101 through the program counter bus 120.

This jump is repeated the designated number of loops. The value set in the loop counter 102 is decremented by "1" by the decrementer 105 each time the jump occurs. When the value of the loop counter 102 becomes zero, it is detected by the zero detector 106, which generates a loop end flag signal. If the loop end flag is set, the jump no longer occurs, and the operation goes out of the loop.

As mentioned above, the three registers 102, 103 and 104 held a fundamental condition when the loop is executed. If the loop is nested, it is necessary to save and restore the information held in these registers 102, 103 and 104.

In the shown embodiment, the saving and restoring of the information held in these registers 102, 103 and 104 are realized by transferring the information between the registers 102, 103 and 104 and the corresponding hardware stacks 130, 132 and 134, respectively.

Namely, when a first loop instruction is being executed, if a second loop instruction is executed (for example as the nesting), the contents of the registers 102, 103 and 104 are pushed or transferred to the corresponding hardware stacks 130, 132 and 134, respectively, and new information is set into the registers 102, 103 and 104, so that the second loop is started. Thereafter, when the loop end condition for the second loop is satisfied and the operation goes out of the second loop, the contents of the hardware stacks 130, 132 and 134 are popped or restored to the corresponding registers 102, 103 and 104, respectively, so that the first loop is restarted from a point where the nesting occurs.

As seen from the above, the transfers of the contents of the hardware stacks 130, 132 and 134 to the corresponding registers 102, 103 and 104, respectively, can be simultaneously executed, since the transfer can be executed without intermediary of the program bus 120. Accordingly, the popping of the hardware stacks 130, 132 and 134 when the loop end condition holds or is satisfied, can be executed in one clock.

In general, the hardware stack 108 is conventionally used not only for the loop processing but also for the saving and restoring of the status in subroutine callings, interrupt processings and exception processings. In the shown embodiment, however, the hardware stacks 130, 132 and 134 for the loop processings are provided independently of the hardware stack 108 for general purpose. Therefore, even if an instruction (for example, a subroutine call instruction, a return instruction, a loop instruction, etc.) using the hardware stack 108 is concurrently generated when the transfers between the hardware stacks 130, 132 and 134 and the corresponding registers 102, 103 and 104 are executed, no inconvenience occurs.

In addition, since the ending processing of the loop can be performed one in clock, continuous loop endings are permitted to occur. In other words, no restriction concerning the loop ending exists in describing or preparing a program.

In this connection, since there is a possibility that the hardware stacks 130, 132 and 134 overflow, it is necessary to set an upper limit of the loop nestings. However, this is negligible as compared with the above mentioned restriction of the programming in the conventional system.

Figure 2:
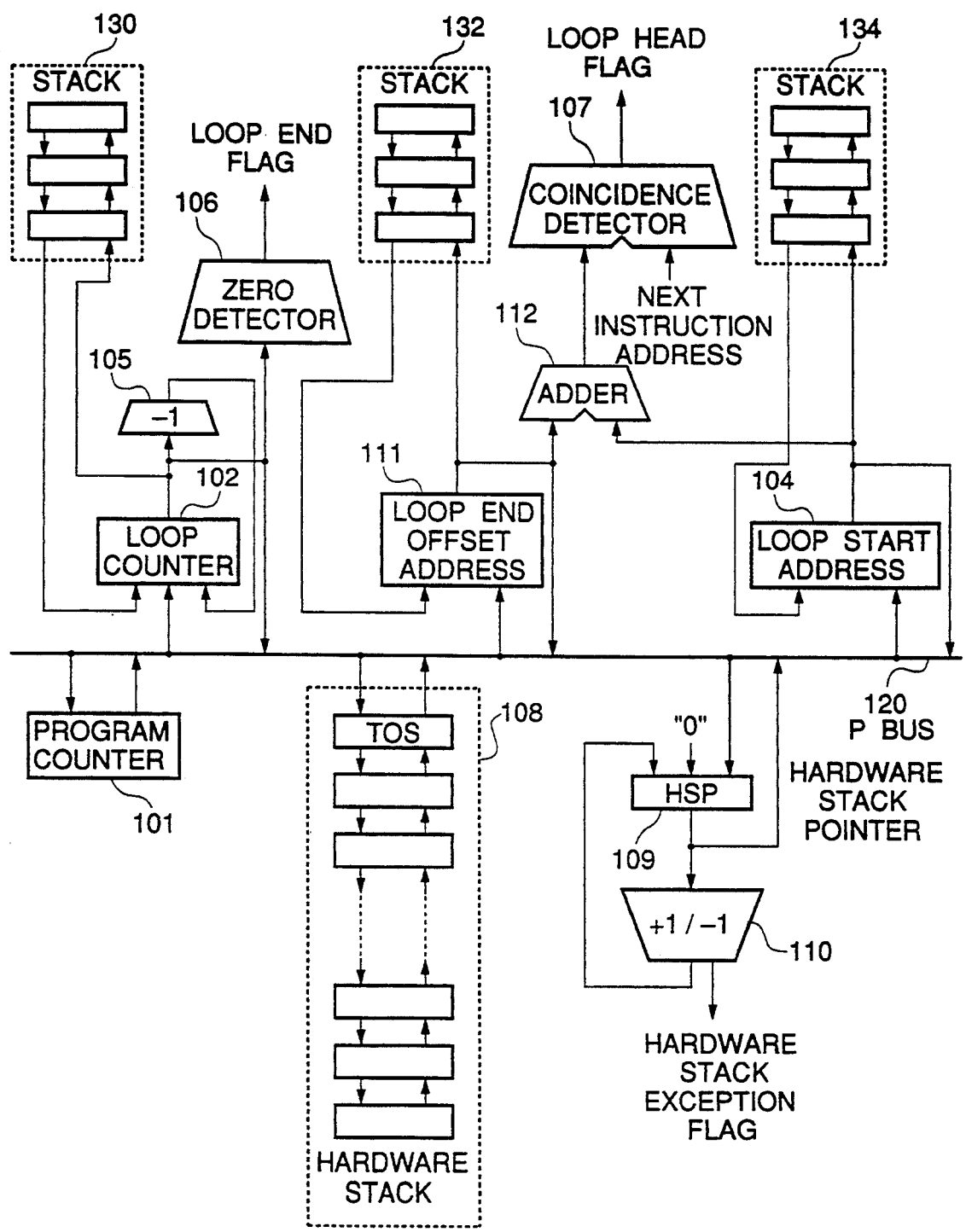
FIG. 2 is a block diagram of a second embodiment of the nesting management mechanism of the loop control system in accordance with the present invention.

Turning to FIG. 2, there is shown a block diagram of a second embodiment of the nesting management mechanism of the loop control system in accordance with the present invention. In FIG. 2, elements similar to those shown in FIG. 1 are given the same Reference Numerals, and explanation thereof will be omitted for simplification of the description.

As seen from comparison between FIGS. 1 and 2, the second embodiment is different from the first embodiment, in that a loop end offset address register 111 is provided in place of the loop end address register 103, and there is additionally provided an adder 112 for adding the content of the loop start address 104 (indicating the loop start address) and a content of the loop end offset address register 111 so as to obtain a loop end address.

The designation of the loop end address by an instruction is more preferable in a program counter relative address designation than in an absolute address designation, since relocatable instruction codes can be prepared in the program counter relative address system. The second embodiment makes it possible to apply the present invention to the program counter relative address system.

As will be apparent from the above description of the embodiments with reference to the drawings, the present invention is remarkable over the conventional system in which the status saving is performed using only one hardware stack, since (1) no extra hardware stack access timing clock is required, and (2) no hardware stack competition or conflict occurs. Therefore, the restriction in programming can be decreased, and it is possible to omit an extra exception processing control at the time of designing the hardware.

The invention has thus been shown and described with reference to the specific embodiments. However, it should be noted that the present invention is in no way limited to the details of the illustrated structures but changes and modifications may be made within the scope of the appended claims.

What is claimed is:

1. A nesting management mechanism for a loop controlling system, comprising:
    a program counter bus,
    a program counter coupled to the program counter bus and updated each time one instruction is executed,
    a main hardware stack of a first-in last-out type coupled to said program counter bus for saving and restoring of said program counter at the time of at least one of interrupt processings and predetermined processings,
    a loop counter coupled with the program counter bus and set with a number of loops to be executed after designation of a loop execution, the loop counter being updated each time one loop is completed,
    a loop start address register coupled to the program counter bus and set with a loop start address upon designation of the loop execution, and
    first and second hardware stacks of a first-in last-out type individually provided for the loop counter and the loop start address register, respectively, so as to save respective contents of the loop counter and the loop start address register only at a time of a loop nesting, said first and second hardware stacks being independent of each other and also being separated from and independent of said main hardware stack.

2. A nesting management mechanism claimed in claim 1 further including:
    a loop end address register coupled to the program counter bus and set with a loop end address upon designation of the loop execution,
    a first detector coupled to receive the loop end address held in the loop end address register and an address of an instruction to be next executed, said first detector including means for generating a loop head branch flag signal upon the address of the instruction to be next executed becoming an address just before the loop end address held in the loop end address register,
    means for transferring the loop start address held in the loop start address register to the program counter through the program counter bus,
    means for decrementing said loop counter, wherein upon generation of the loop head branch flag signal, the loop start address held in the loop start address register is transferred to the program counter through the program counter bus by said transferring means, and the loop counter is decremented by said decrementing means, and
    a third hardware stack of a first-in last-out type individually provided for the loop end address register, separately from said main hardware stack and said first and second hardware stacks, so as to save a content of the loop end address register only at the time of the loop nesting.

3. A nesting management mechanism claimed in claim 2 wherein said decrementing means includes a decrementer coupled to the loop counter for decrementing the content of the loop counter each time one loop is completed,
    said nesting management mechanism further including a second detector coupled to the loop counter for detecting the content of the loop counter and for generating a loop end flag signal when the content of the loop counter becomes zero, so that upon generation of the loop end flag signal, the loop start address is not transferred to the program counter by said transferring means and a branch is not performed.

4. A nesting management mechanism claimed in claim 1 further including:
    a loop end offset address register coupled to the program counter bus and set with a loop end offset address upon designation of the loop execution,
    an adder for adding the loop end offset address held in the loop end offset address register with the loop start address held in the loop start address register to generate a loop end address, a first detector coupled to receive an output of the adder and an address of an instruction to be next executed, said first detector including means for generating a loop head branch flag signal upon the address of the instruction to be next executed becoming an address just before the loop end address generated by the adder, means for transferring the loop start address held in the loop start address register to the program counter through the program counter bus, means for decrementing said loop counter, wherein upon generation of the loop head branch flag signal, the loop start address held in the loop start address register is transferred to the program counter through the program counter bus by said transferring means, and the loop counter is decremented by said decrementing means, and a third hardware stack of a first-in last-out type individually provided for the loop end address register for saving a content of the loop end address register at the time of the loop nesting.

5. A nesting management mechanism claimed in claim 4 wherein said decrementing means includes a decrementer coupled to the loop counter for decrementing the content of the loop counter each time one loop is completed, said nesting management mechanism further including a second detector coupled to the loop counter for detecting the content of the loop counter and for generating a loop end flag signal when the content of the loop counter becomes zero, so that upon generation of the loop end flag signal, the loop start address is not transferred to the program counter by said transferring means and a branch is not performed.

6. A nesting management mechanism claimed in claim 1, wherein the respective contents of the loop counter and the loop start address register at the time of the loop nesting are simultaneously saved to said first and second hardware stacks.

7. A nesting management mechanism claimed in claim 2, wherein the respective contents of the loop counter and the loop start address register at the time of the loop nesting are simultaneously saved to said first and second hardware stacks.

8. A nesting management mechanism claimed in claim 3, wherein the respective contents of the loop counter and the loop start address register at the time of the loop nesting are simultaneously saved to said first and second hardware stacks.

9. A nesting management mechanism claimed in claim 4, wherein the respective contents of the loop counter and the loop start address register at the time of the loop nesting are simultaneously saved to said first and second hardware stacks.

10. A nesting management mechanism claimed in claim 5, wherein the respective contents of the loop counter and the loop start address register at the time of the loop nesting are simultaneously saved to said first and second hardware stacks.

11. A nesting management mechanism claimed in claim 1, wherein the first and second hardware stacks are respectively coupled to said loop counter and said loop start address register, said program counter bus being positioned in a position other than between said first hardware stack and said loop counter and other than between said second hardware stack and said loop start address register.

12. A nesting management mechanism claimed in claim 2, wherein the first and second hardware stacks are respectively coupled to said loop counter and said loop start address register, said program counter bus being positioned in a position other than between said first hardware stack and said loop counter and other than between said second hardware stack and said loop start address register.

13. A nesting management mechanism claimed in claim 3, wherein the first and second hardware stacks are respectively coupled to said loop counter and said loop start address register, said program counter bus being positioned in a position other than between said first hardware stack and said loop counter and other than between said second hardware stack and said loop start address register.

14. A nesting management mechanism claimed in claim 4, wherein the first and second hardware stacks are respectively coupled to said loop counter and said loop start address register, said program counter bus being positioned in a position other than between said first hardware stack and said loop counter and other than between said second hardware stack and said loop start address register.

15. A nesting management mechanism claimed in claim 5, wherein the first and second hardware stacks are respectively coupled to said loop counter and said loop start address register, said program counter bus being positioned in a position other than between said first hardware stack and said loop counter and other than between said second hardware stack and said loop start address register.

16. A nesting management mechanism for a loop controlling system, comprising:

a program counter bus;

a program counter coupled to the program counter bus and updated each time one instruction is executed;

a main hardware stack of a first-in last-out type coupled to said program counter bus for saving and restoring of said program counter at the time of at least one of interrupt processings and predetermined processings;

a loop counter coupled with the program counter bus and set with a number of loops to be executed after designation of a loop execution, the loop counter being updated each time one loop is completed;

a loop start address register coupled to the program counter bus and set with a loop start address upon designation of the loop execution;

first and second hardware stacks of a first-in last-out type individually provided for the loop counter and the loop start address register, respectively, so as to save respective contents of the loop counter and the loop start address register only at a time of a loop nesting, said first and second hardware stacks being independent of each other and also being separated from and independent of said main hardware stack;

a loop end address register coupled to the program counter bus and set with a loop end address upon designation of the loop execution;

a first detector coupled to receive the loop end address held in the loop end address register and an address of an instruction to be next executed, said first detector including means for generating a loop head branch flag signal upon the address of the instruction to be next executed becoming an address just before the loop end address held in the loop end address register;

means for transferring the loop start address held in the loop start address register to the program counter through the program counter bus;

means for decrementing said loop counter, wherein upon generation of the loop head branch flag signal, the loop start address held in the loop start address register is transferred to the program counter through the program counter bus by said transferring means, and the loop counter is decremented by said decrementing means; and a third hardware stack of a first-in last-out type individually provided for the loop end address register, separately from said main hardware stack and said first and second hardware stacks, so as to save a content of the loop end address register only at the time of the loop nesting.

* * * * *